US006606130B1

(12) United States Patent
George (10) Patent No.: US 6,606,130 B1
(45) Date of Patent: Aug. 12, 2003

(54) PROJECTION VIDEO DISPLAY WITH MULTIPLE PHOTO SENSORS

(75) Inventor: John Barrett George, Carmel, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/343,753

(22) Filed: Jun. 30, 1999

(51) Int. Cl.[7] .............................. H04N 5/64; H04N 9/31
(52) U.S. Cl. ...................... 348/744; 348/745; 348/191
(58) Field of Search ................................. 348/745, 746, 348/747, 190, 191, 806, 807; H04N 5/64, 9/31, 3/22, 3/26

(56) References Cited

U.S. PATENT DOCUMENTS

| 4,999,703 A | * | 3/1991 | Henderson ................... 348/747 |
| 5,181,103 A | * | 1/1993 | Aoyama Tatsuya ......... 348/728 |
| 5,872,593 A | * | 2/1999 | Kawashima ................. 348/745 |
| 5,883,476 A | * | 3/1999 | Noguchi et al. ............. 348/745 |
| 5,898,465 A | * | 4/1999 | Kawashima et al. ........ 348/745 |

\* cited by examiner

*Primary Examiner*—John Miller
*Assistant Examiner*—Trang U. Tran
(74) *Attorney, Agent, or Firm*—Joseph S. Tripoli; Harvey D. Fried; Francis A. Davenport (57) ABSTRACT

A projection television display apparatus comprises a display device with an image formed for projection and a display screen for receiving the projected image. A plurality of photo sensors are located adjacent to edges of the display screen and each generates an output signal responsive to an intensity of illumination by the projected image. A detector with controllable detection threshold is coupled to the photo sensors for generating a signal having a first state when the output signal generated by each of the plurality photo sensors is greater than the detection threshold, and a second state when the output signal generated by each of said plurality photo sensors is less than the detection threshold. A controller is coupled to the display device and to the detector for setting the detection threshold for the output signal generated by each one of the plurality of photo sensors. In response to the signal having the first state, the controller moves the image on the display device to sequentially illuminate another one of the plurality of photo sensors.

6 Claims, 7 Drawing Sheets

PROJECTION VIDEO DISPLAY WITH MULTIPLE PHOTO SENSORS

This invention relates to the field of video projection display and in particular to the measurement of photo sensor signals generated by incident projected illumination.

BACKGROUND OF THE INVENTION

In a projection video display, geometrical raster distortions result from the physical placement of the cathode ray display tubes. Such raster distortions are exacerbated by the use of cathode ray tubes with curved, concave display surfaces and the inherent magnification in the optical projection path. The projected image is composed of three scanning rasters which are required to be in register one with the other on a viewing screen. The precise overlay of the three projected images requires the adjustment of multiple waveforms to compensate for geometrical distortion and facilitate the superimposition of the three projected images. However, manual alignment of multiple waveforms is labor intensive during manufacturing, and without the use of sophisticated test equipment may preclude setup at a user location. Thus an automated convergence system is disclosed which simplifies manufacturing alignment and facilitates user location adjustment. An automated alignment system may employ raster edge measurement at peripheral display screen locations in order to determine raster size and convergence. Such raster edge measurement may be facilitated by a plurality of photo sensors, which to simplify sensor connection and measurement system interface requirements the sensors are coupled in parallel arrangement. However, a parallel coupling arrangement necessitates a measurement control system capable of identifying individual sensors from the plurality.

SUMMARY OF THE INVENTION

A projection television display apparatus comprises a display device with an image formed for projection and a display screen for receiving the projected image. A plurality of photo sensors are located adjacent to edges of the display screen and each generates an output signal responsive to an intensity of illumination by the projected image. A detector with controllable detection threshold is coupled to the photo sensors for generating a signal having a first state when the output signal generated by each of the plurality photo sensors is greater than the detection threshold, and a second state when the output signal generated by each of said plurality photo sensors is less than the detection threshold. A controller is coupled to the display device and to the detector for setting the detection threshold for the output signal generated by each one of the plurality of photo sensors. In response to the signal having the first state, the controller moves the image on the display device to sequentially illuminate another one of the plurality of photo sensors.

DETAILED DESCRIPTION

Figure 1:
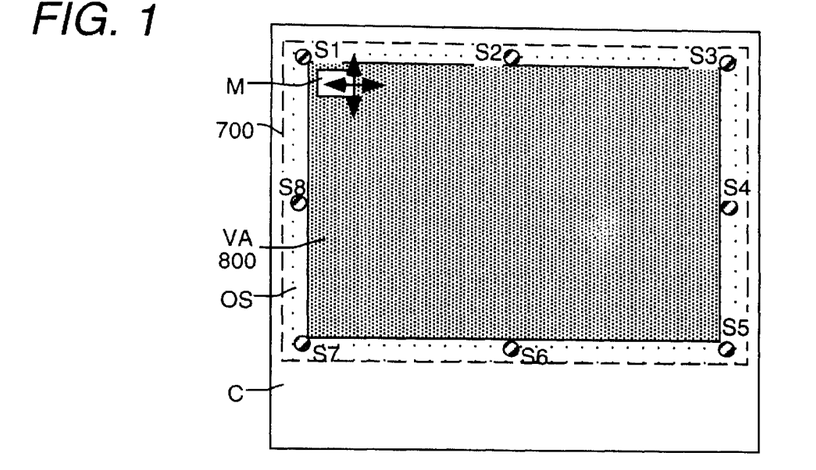
FIG. 1 is a simplified front view of a projection video display.

FIG. 1 illustrates a front view of a video projection display apparatus. The projection display comprises a plurality of cathode ray tubes with raster scanned images which are projected on to screen 700. A cabinet supports and surrounds screen 700 and provides a picture display area 860 which is slightly smaller than the screen. Screen 700 is depicted with a broken line to indicate an edge area which is concealed within cabinet C and which may be illuminated with raster scanned images when operated in an overscan mode as indicated by area OS. Photo sensors are located adjacent to the periphery of screen 700 within the concealed edge area and outside viewed area 800. Eight sensors are shown in FIG. 1, positioned at the corners and at the centers of the screen edges. Thus with these sensor positions it is possible to measure an electronically generated test pattern, for example peak video value block M, to determine picture width and height and certain geometric errors, for example, rotation, bow, trapezium, pincushion etc., and thereby align the displayed images to be superimposed one with the other over the whole of the screen area. Measurements are performed in both horizontal and vertical directions in each of the three projected color images thus yielding at least forty eight measured values.

Figure 2:
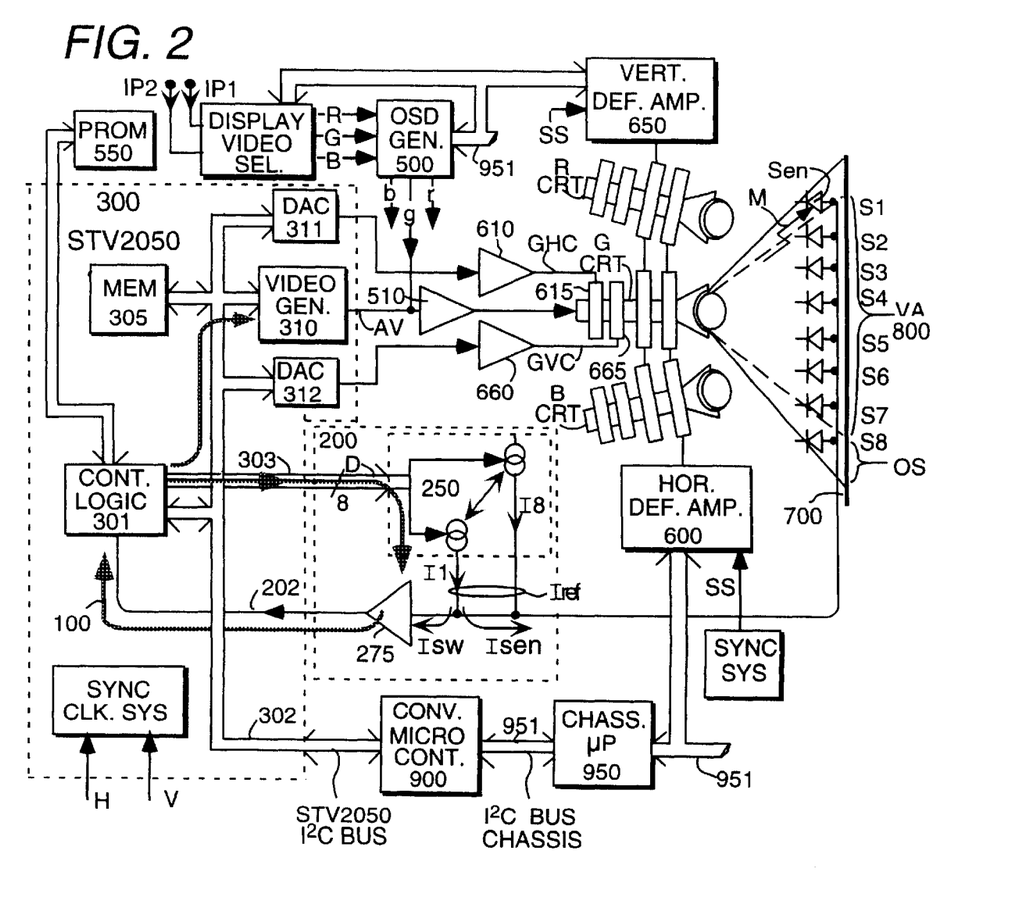
FIG. 2 is a simplified block diagram of a video image projection display apparatus including inventive features.

Operation of the measurement and alignment system will be explained with reference to FIG. 2 which depicts in block diagram form, part of a raster scanned video projection display. In FIG. 2 three cathode ray tubes, R, G and B form raster scanned monochromatic color images which are directed through individual lens systems to converge and form a single display image 800 on screen 700. Each cathode ray tube is depicted with four coil sets which provide horizontal and vertical deflection and horizontal and vertical convergence. The horizontal deflection coil sets are driven by a horizontal deflection amplifier 600 and vertical deflection coil sets are driven by a vertical deflection amplifier 650. Both horizontal and vertical deflection amplifiers are driven with deflection waveform signals that are controlled in amplitude and waveshape via data bus 951 and synchronized with the signal source selected for display. Exemplary green channel horizontal and vertical convergence coils 615 and 665 respectively, are driven by amplifiers 610 and 660 respectively, which are supplied with convergence correction waveform signals. The correction waveform signals GHC and GVC may be considered representative of DC and AC convergence signals, for example static and dynamic convergence. However, these functional attributes may be facilitated, for example by modifying all measurement location addresses by the same value or offset to move the complete raster and achieve an apparent static convergence or centering effect. Similarly, a dynamic convergence effect may be produced by modification of the location address of a specific measurement location. Correction waveform signals GHC and GVC for the green channel are generated by exemplary digital to analog converters 311 and 312 which convert digital values read from memory 550.

An input display signal selector selects, by means of bus 951, between two signal sources IP1 and IP2, for example a broadcast video signal and an SVGA computer generated display signal. Video display signals RGB, are derived from the display video selector and electronically generated message information, for example user control information, display setup and alignment signals and messages generated responsive commands form controllers 301, 900 and 950 coupled via buses 302 and 951, may be combined by on screen display generator 500. During automated sensitivity calibration or convergence alignment, controller 900 sends commands via a data bus 302 to controller 301 which instructs video generator 310 to generate an exemplary green channel calibration video test signal AV comprising an exemplary black level signal with a rectangular block M having a predetermined video amplitude value. Controllers 900 and 301 also position block M to illuminate exemplary sensor S1 by determining horizontal and vertical timing to position block M within the scanned display raster or by moving the scanned raster, or a part of the scanned raster containing the marker block M. Green channel test signal AV is output from IC 300 and combined at amplifier 510, with the green channel output signal from on screen display generator 500. Thus, the output signal from amplifier 510 is coupled to exemplary green cathode ray tube GCRT, and may include display source video and or OSD generated signals and or IC 300 generated calibration video test signals AV.

Controller 301 also executes a program stored in program memory 308 which comprises various algorithms. To facilitate an initial setup adjustment controller 301 outputs a digital word D on data bus 303, which is coupled to a controllable current source 250. The digital word D represents a specific current to be generated by current source 250 and supplied to sensors S1–8 and sensor detector 275.

To facilitate adjustment and alignment of the three color images, setup block M is generated as described previously and coupled to exemplary green CRT. In FIG. 1 test pattern, block M is shown approaching sensor S1, and as previously mentioned each sensor may be illuminated by the timed generation of the marker block within a video signal projected with an overscanned raster, or by positioning the scanned raster such that marker block M lights sensor S1. With certain display signal inputs, for example computer display format signals, substantially all of the scanned area may be utilized for signal display thus operation with an overscanned raster is largely precluded. During operation with computer display format signals, raster overscan is limited to a nominal few percent, for example 1%. Hence under these substantially zero overscan conditions exemplary sensor S1 may be illuminated by raster positioning of block M. Clearly, individual sensor illumination may be facilitated with a combination of both video signal timing and raster positioning.

Each sensor generates an electron flow which enables conduction in a substantially linear relationship to the intensity of the illumination incident thereon. However, the intensity of illumination at each individual sensor may vary greatly for a number of reasons, for example, the phosphor brightness of each individual CRT may be different, there may be lens and optical path differences between the three monochromatic color images. As each CRT ages the phosphor brightness declines, furthermore with the passage of time, dust may accumulate within the optical projection path to reduce the intensity of illumination at the sensor. A further source of sensor current variability results from variations in sensitivity between individual sensors and their inherent spectral sensitivity. For example, in a silicon sensor, sensitivity is low for blue light and increases through the green and red spectrum to reach a maximum in the near infra red region. Thus, it may be appreciated that each individual sensor may conduct widely differing photo generated currents. Hence, to facilitate stable, repeatable measurements, it is essential that these sensor current variations are individually measured and a detection threshold set for each sensor and illuminating color. Thus, having determined the peak sensor current, which is directly proportional to the intensity of illumination, individual sensor detection threshold values may be stored to permit the subsequent detection of a lit or unlit sensor to occur at a consistent amplitude point of each sensor current, for example at approximately 50% amplitude value.

With reference to FIG. 2, video generator 310 is instructed by control logic 301 to generate an exemplary green video block M having an initial non-peak video value and positioned on a substantially black or black level background. Similar video blocks with non-peak video values may be generated in each color channel, which when generated simultaneously and superimposed at the screen produce a white image block on a substantially black background. Thus, an exemplary green block M is generated by video generator 310 and coupled via amplifier 510 to the green CRT. The video generator 310 is controlled by the micro controller 301 to generate the green block M at a horizontal and vertical screen position such that a specific sensor, for example, sensor S1, is illuminated by green light from block M. Illumination of the sensor results in a photo generated current Isen, as depicted in FIG. 2.

The widely differing photo generated sensor currents described previously are advantageously compensated, calibrated and measured by means of an inventive control loop 100 depicted in FIG. 2. Sensor detector 275 is depicted in circuit block 200 of FIG. 2 and is shown in greater detail in FIGS. 8A and 4B. In simple terms a reference current Iref is generated by a digitally controlled current source 250. The reference current is supplied to both exemplary opto sensor S1 and sensor detector 275. In the absence of sensor illumination, sensor S1, represents a high impedance and consequently diverts an insignificant current, Isen, from reference current Iref. Thus the majority of reference current Iref, is coupled to sensor detector 275 as current Isw. Current Isw biases detector 275 such that the output state is low, which is chosen to represent an unlit or unilluminated sensor. When sensor S1 is illuminated, photo generated charge causes the sensor to present a lower impedance and shunt a greater current Isen, from reference current Iref, thus diverting current Isw from sensor detector 275. At a particular illumination level, sensor S1 diverts sufficient current from sensor detector 275 to cause it to switch off and assume a high, nominally supply voltage potential, which is chosen to be indicative of a lit or illuminated sensor. The output from sensor detector 275 is positive going pulse signal 202 which is a coupled to an input of digital convergence IC STV2050. The rising edge of pulse signal 202 is sampled which causes horizontal and vertical counters to stop thus providing counts which determine where in the measurement matrix the lit sensor occurred.

The sensor current is advantageously measured by controllably increasing reference current Iref until sensor detector 275 switches to indicate loss of sensor illumination. The value of reference current that caused detector 275 to indicate loss of sensor illumination is representative of the level of illumination incident on the sensor. Thus this current may be processed and stored as a sensor and color specific threshold value. The stored reference current value differs between sensors and from color to color, but detector switching is equalized to occur for illumination values of down to one half of the measured Isen switching value.

Figure 3A:
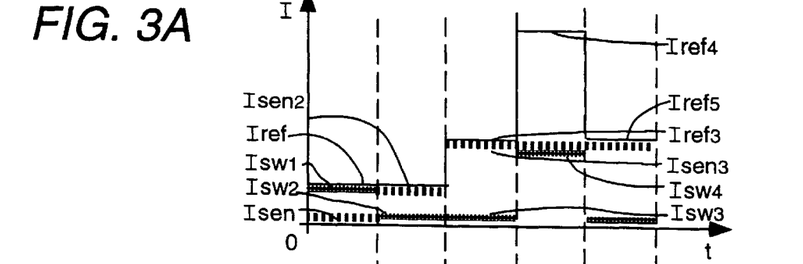
FIG. 3A depicts various currents occurring during a sequence of time periods.
Figure 3B:
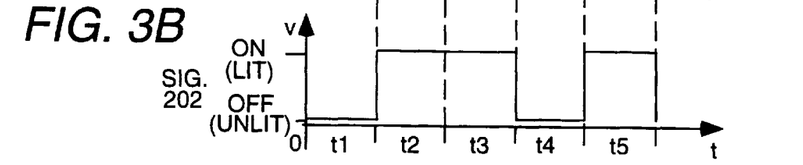
FIG. 3B illustrates a sensor detector output signal during the same time periods.

Various currents occurring over a sequence of time periods, for example TV frame periods, are shown in FIG. 3A while FIG. 3B illustrates the sensor detector output signal during the same periods. Upon initiation, at time period t1, the reference current Iref is controlled by a digital word D1, generated by control logic 301, in response to micro controller 900. Digital word D1 is output with a value equal to 255 which results in a minimum value for reference current Iref. In addition, at time period t1 exemplary sensor S1 is not illuminated, and any current Isen is generated by dark current or leakage effects. Thus, the minimized reference current Iref is largely conducted by sensor detector 275 as current Isw, which causes output signal 202 to assume a low or essentially zero volt state, indicating an unlit sensor. At time period t2, video block M is generated and positioned to illuminate sensor S1 causing a photo current Isen to be generated or conducted. Thus, reference current Iref is divided between photo sensor S1 and sensor detector 275. However, the magnitude of sensor current Isen2 is greater than current Iref, thus detector 275 is starved of current causing it switch states. Thus, output signal 202 assumes a high voltage potential which is sampled by control logic 301 and indicates the presence of sensor illumination via bus 302 to micro controller 900. As a consequence of detected illumination, at time period t3 micro controller 900 instructs controller 301 to output a new digital word D2 which causes the reference current to increase to Iref3. However, even with an increased reference current the sensor current Isen is sufficient to starve detector 275 of current, as depicted by Isw3 and thus detector output 202 to continues to indicate a lit sensor. Control logic 301 senses output signal 202 indicating the lit sensor and via micro controller 900 generates a further current control word D4 which increases reference current to a value of Iref4. This increased reference current is sufficient to supply both the sensor S1 and detector 275, thus the detector switches and the output signal 202 assumes an essentially zero volt state which indicates to logic 301 and micro controller 900 that sensor S1 is now unlit. Thus by progressively increasing the reference current, the sensitivity of the sensor signal detector is reduced, and a value Iref4, is reached which is representative of the maximum sensor illumination. The value of current Iref4 is halved and stored as Iref5 in memory 305 for use during subsequent measurement of exemplary sensor S1 when illuminated by an exemplary green marker block M. The reference current is halved to facilitate sensor detection when sensor illumination is reduced to approximately half intensity as a consequence of dirt obscuration or diminished CRT output.

Figure 4A:
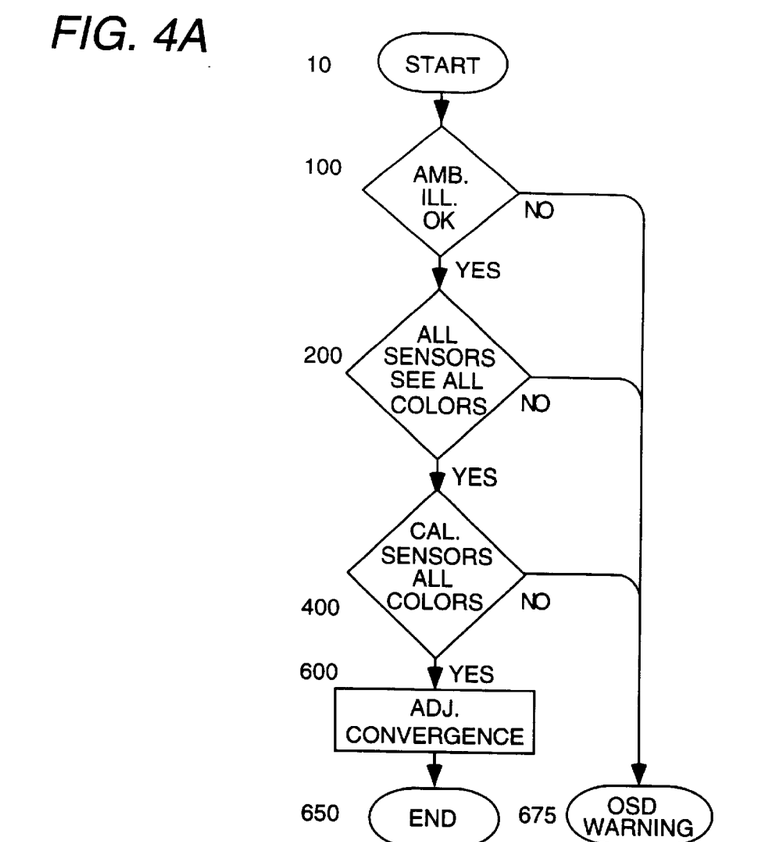
FIG. 4A shows an exemplary automated setup sequence.
Figure 5:
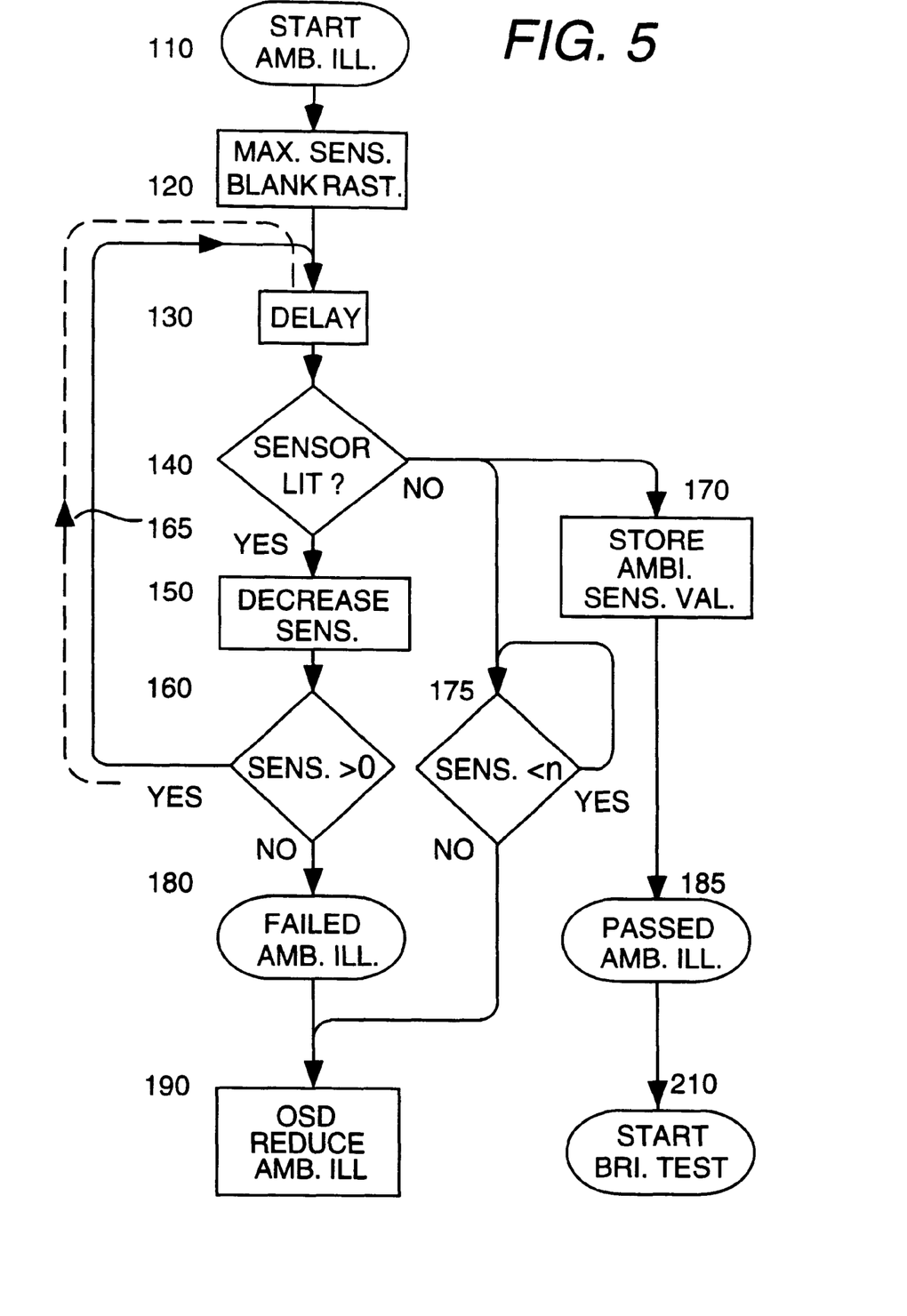
FIG. 5 shows an exemplary ambient illumination calibration sequence.

FIG. 4A shows an exemplary automated setup sequence which is initialed at step 10. At step 100 all sensors are evaluated for the ingress of unwanted illumination. Adjustments, detailed in FIG. 5, are made to compensate for unwanted spurious sensor lighting, which if successful enables the automated setup to continue to step 200. However, if the unwanted sensor illumination is beyond a range of compensation, the setup sequence is terminated and an on screen display message is generated at step 675, advising of test termination and suggesting that ambient illumination of the display screen be reduced by reducing room lighting or closing window curtains.

Figure 6:
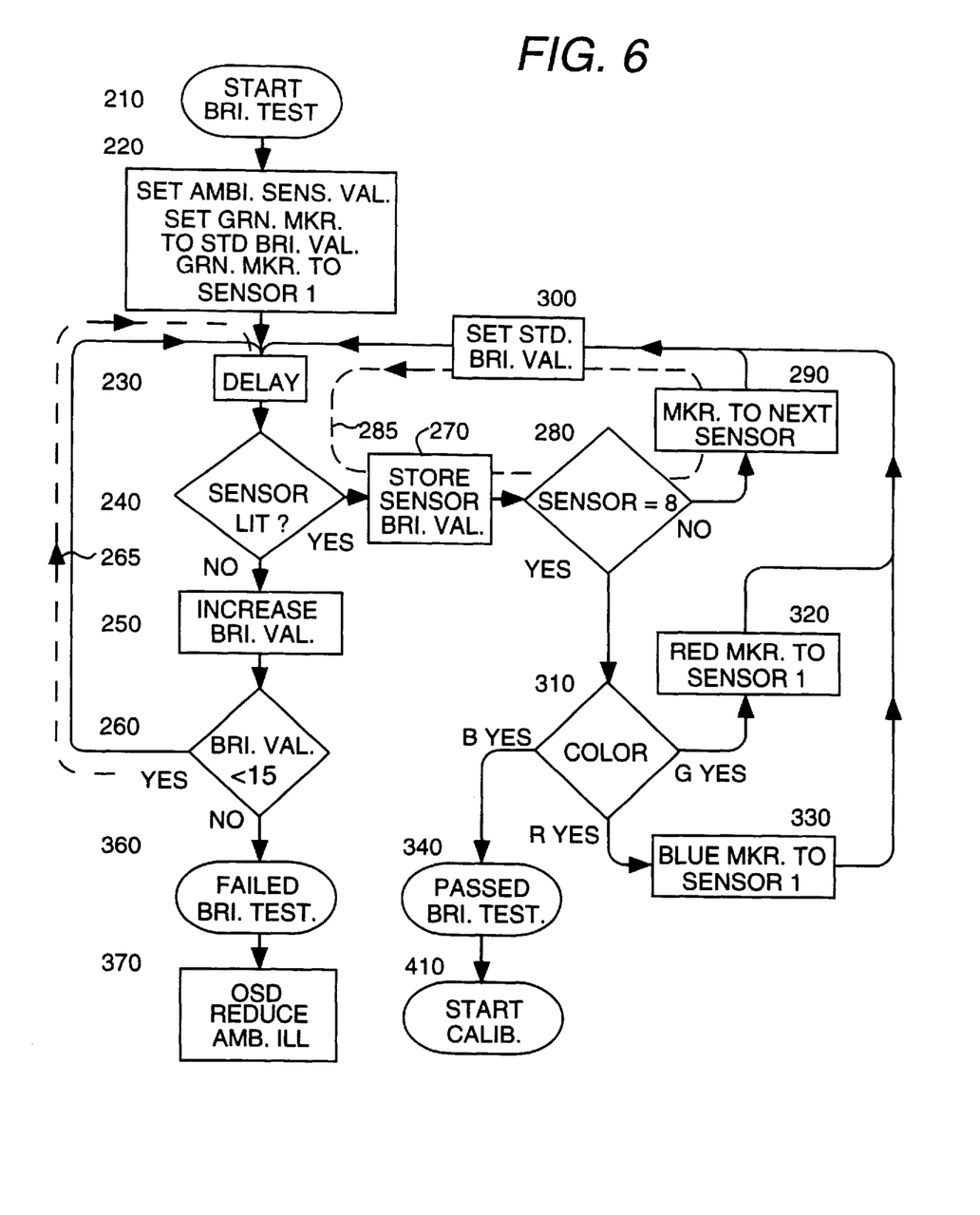
FIG. 6 shows an exemplary sensor calibration sequence.

At step 200, which is shown in detail in FIG. 6, the sensors are tested to determine their ability to be illuminated by the exemplary marker block M. Once again if the test is successful the automated setup continues to step 400 detailed in FIG. 7. However, if each sensor fails to respond to illumination by marker block M the setup sequence is terminated and an on screen display message is generated advising of test termination and suggesting that ambient illumination of the display screen be reduced by reducing room lighting or closing window curtains.

Thus, having compensated for unwanted sensor illumination, step 400 measures the sensitivity of each sensor for each position and color. Once again, measurement failure at step 400 terminates the auto setup sequence with an OSD message indicating the failure and suggesting possible remedies. With the successful completion of step 400 the automated sequence progresses to step 600 where electronically generated patterns are measured to enable image registration to be performed.

Figures 4B, 4C:
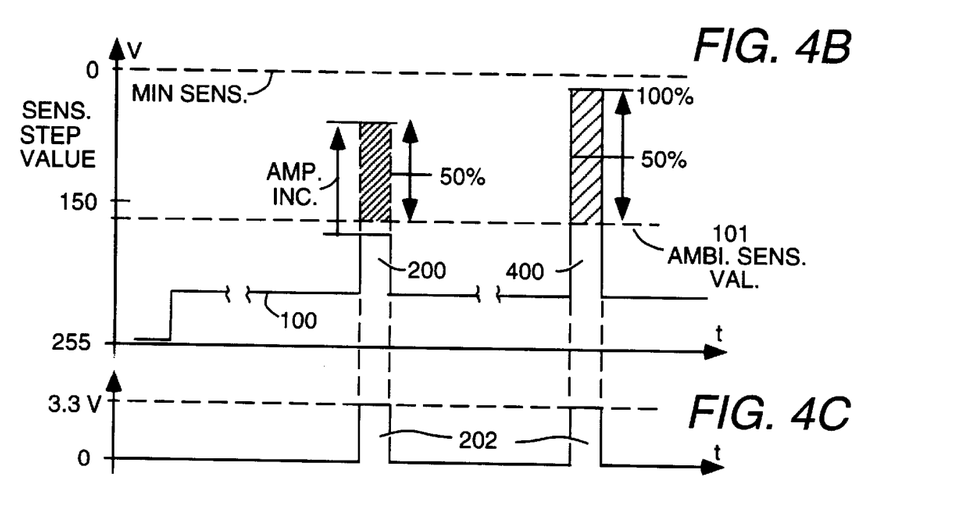
FIGS. 4B and 4C depict various photo sensor signals and output signal 202.

FIG. 4B depicts photo sensor signals generated under various conditions. Signal 100 depicts a generally constant amplitude signal generated by unwanted illumination of a photo sensor and is shown with a broken line to portray a constant presence to which wanted photo sensor signal responses, for example signals 200 and 400, are added. FIG. 4C depicts detector 275 output signal 202 on the same time axis as FIG. 4B. During the control sequence depicted in diamond box 100 of FIG. 4A, the detection threshold is adjusted such that ambient light generated signal, 100 of FIG. 4B is too small to exceed threshold 101, AMBI. SENS. VAL. Thus no output signal 202 is generated by detector 275, as depicted in FIG. 4C.

Signal 200 of FIG. 4B depicts a wanted photo sensor signal, for example, generated by green illumination. Signal 200 is illustrated with an amplitude which is insufficient to exceed threshold signal 100, thus the extinguishment of ambient illumination detection has also extinguished detection of a lit green sensor. In diamond box 200 of FIG. 4A, the sensor is tested to determine if it can be illuminated by an exemplary marker block M. Thus the marker video amplitude is incremented, depicted by AMP. INC. to a value which permits the sensor signal to exceed threshold 101, and generate a corresponding output signal 202 of FIG. 4C.

Signal 400 of FIG. 4B depicts a wanted photo sensor signal generated for example by blue illumination. The sensor signal clearly exceeds threshold 101, thus the sequence of diamond box 400, of FIG. 4A, is followed to determine the peak sensor signal value, which is equal to the reference current required to extinguish detection. This peak value amplitude value is halved and stored as the blue detection level or threshold.

FIG. 5 shows an exemplary adjustment sequence which detects the presence of unwanted sensor illumination and automatically adjusts a sensor detection threshold to progressively compensate for ambient lighting until the unwanted illumination fails to be detected. Thus the amount of ambient light compensation sets a maximum range of compensation available for each sensor position and color combination. Ambient illumination compensation starts at step 110 with a blank raster generated and sensor detector sensitivity set to a maximum value at step 120. In the exemplary detector of FIGS. 2 and 9, sensitivity or switching threshold may be set to any one of 255 values determined by digital word D generated by controller 301. Maximum sensitivity occurs with a digital word value of 255 which results in a minimum current Iref. Thus, with a blank raster, video block M is not generated and any lit sensor must be illuminated by unwanted light. At step 130 a delay is introduced to allow detection of a lit sensor to occur at step 140 and be reported to convergence micro computer 900 within a display frame period. If step 140 tests YES, the sensor is lit by unwanted light and the sensor detector sensitivity is reduced at step 150. In response to an instruction from micro computer 900, coupled via bus 302, controller 301 outputs a new value for word D. At step 160 a test is performed to determine that the decremented sensitivity value is greater than zero. A YES at 160 forms loop 165 which continues to decrease detector sensitivity until test 140, lit sensor, indicates NO signifying that the effect of unwanted sensor illumination has been compensated or nullified. The NO at step 140, causes the sensitivity value which extinguished ambient light detection to be stored as AMBI. SENS. at step 170. The NO at step 140 also results in the sensitivity value being tested, at step 175, to determine if the value is less than a predetermined value n. A NO at step 175 results in the generation of an on screen display message suggesting that ambient illumination is of a sufficiently high level which may result in subsequent setup failure. For example, blue sensor signal levels may exceed the remaining sensitivity control range, or conversely a green sensor signal may not be of sufficient amplitude to exceed the ambient light extinguishment threshold. Thus restarting the auto sequence is suggested with reduced ambient illumination. However, although the advisory OSD message is generated responsive to the NO at step 175, the ambient illumination compensation test is completed as indicated at step 185, for example by means of an OSD message, and the automated sequence continues to initiate marker brightness calibration at step 210.

However, if step 140 continues to test YES as loop 165 successively reduces detector sensitivity and eventually step 160 will test NO, indicating for example that word D is equal to zero. Since with minimum detector sensitivity, a lit sensor continues to be detected, hence the unwanted illumination is excessive and beyond the range of compensation thus the auto sequence is terminated at step 180. At step 190 an on screen message is generated to advise the user that incident screen illumination must be reduced to permit automatic setup to be performed.

FIG. 6 illustrates an exemplary sequence which determines that the sensor detector can detect a sensor signal produced by marker block M generated and displayed in each of the three display colors. The sequence starts at step 210 and at step 220 the sensor detector sensitivity is set to the value, AMBI. ILL. stored at step 165 in FIG. 5. An exemplary marker block M is generated with a predetermined video amplitude value, of for example step 12. Marker block M is displayed on a green CRT and positioned on the display surface such that when projected, it will illuminate a sensor, for example sensor 1. A delay, for example one display frame period, is applied at step 230 to allow time for a lit sensor to be detected. If the CRT display is scanned with an interlaced format, block M may be detected in either of the interlaced fields comprising the display frame period, hence step 230 allows for sensor detection of block M in either display field. A test is performed to detect a lit sensor at step 240, where a NO causes step 250 to increase the brightness, or video amplitude of marker M from the initial predetermined value. At step 260 the marker amplitude value is tested to be less than 15 with a YES forming a loop 265 back the delay 230. Thus loop 265 progressively increases the video amplitude of marker M by one amplitude control step until sensor 1 is detected as lit and step 240 tests YES. When the sensor is lit the corresponding brightness, or marker amplitude value is stored at step 270 as BRI. VAL.

However, if the lit sensor test 240 continues to test NO, eventually a maximum value will be reached for the video amplitude where test 260, BRI. VAL. will equal 15. Thus, NO at test 260 results in the termination of the automatic calibration sequence at step 360 and the generation of an on screen display message at step 370, indicating that the intensity of illumination incident on the exterior screen surface must be reduced to permit the automatic sequence to be reinitiated.

With sensor 1 lit at step 240, a further test is performed at step 280 to determine if all eight sensor positions have been evaluated. A NO at step 280 causes step 290 to reposition block M on the CRT face to illuminate exemplary sensor 2. The video amplitude of marker block M is set to the predetermined, exemplary amplitude value 12, at step 300 and the lit sensor loop 265 is rejoined at delay 230. Thus as for sensor position 1 loop 265 is traversed until step 240 tests YES, to detect a lit sensor, or until maximum video amplitude is reached and step 260 tests NO terminating the calibration sequence as described. If step 240 tests YES, a second loop 285 is formed where amplitude video amplitude values are stored, at step 270, for marker M at sensor positions 2 through 8.

When marker amplitude values have been determined and stored for all eight sensor positions, step 280 tests YES causing a color selection test to be performed at step 310. Since the sequence initiated with the green CRT step 310 tests G YES which at step 320, terminates the green marker display and causes a red marker to be generated, displayed and positioned on a red CRT to illuminate sensor position 1. At step 300 marker video amplitude is set to the predetermined, exemplary amplitude value 12 and loops 265 and 285 are successively traversed storing amplitude values, at step 270, for each of the eight red sensor positions. Thus, sensor count step 280, tests YES causing step 310 to test R YES which results in step 320 terminating the red marker display and causing a blue marker to be generated, displayed and positioned on a blue CRT to illuminate sensor position 1. Again the marker video amplitude is set at step 300 and loops 265 and 285 are successively traversed storing amplitude values, at step 270, for each of the eight blue sensor positions. With the completion of sensor eight, step 280 tests YES and color selection test 310 tests B YES. Thus step 340 indicates that the brightness or video amplitude test has been successfully completed for all colors and sensor positions and that sensor sensitivity calibration may be initiated at step 410. In summary, completion of the sequences depicted in FIG. 5 compensates for unwanted display surface illumination by establishing a sensitivity value for lit sensor detection that precludes the unwanted light. The sequences shown in FIG. 6 establish that, with the sensitivity value necessary to prevent spurious measurement of extraneous light, each sensor can see markers generated in each color.

Figure 7:
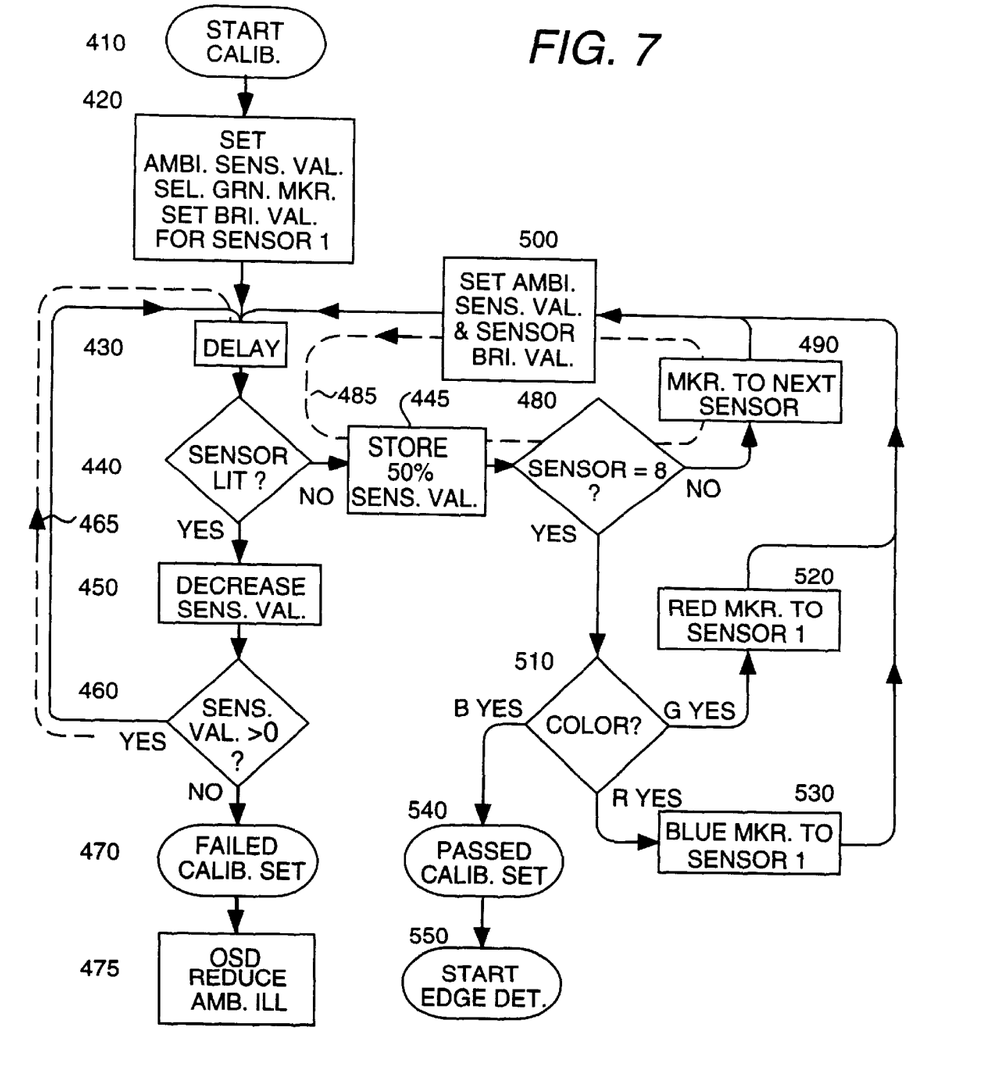
FIG. 7 shows an exemplary sensor threshold calibration sequence.

The widely differing photo generated sensor currents described previously are measured and stored by use of the exemplary sensor calibration sequence shown in FIG. 7. In simple terms the sequence shown in FIG. 7 determines a maximum value for each sensor output signal and then establishes a sensitivity value, or detector switching threshold, which allows detection to occur at substantially half the peak value for each sensor signal. Sensor sensitivity calibration is initiated at step 410 and at step 420 the detector sensitivity is set to the value determine and stored as AMBI. SENS. at step 165. A green marker block M is generated with the previously determined video amplitude value BRI. VAL. read from step 270. Block M is positioned on the green CRT to illuminate sensor position 1 when projected. For the reasons discussed previously a delay 430 is included to provide time to detect a lit sensor condition occurring in either field of an interlaced scanning system.

Step 440 tests to determine if a sensor has been lit, clearly since the initial sensitivity at 420 was set to AMBI. SENS., the highest sensitivity value which excluded detection of extraneous light, sensor 1 should see green block M and detect it as lit. The YES at 440 causes the sensitivity value, currently AMBI. SENS., to be reduced at step 450. This reduced sensitivity value is tested at step 460 to determine if the value is greater than zero, thus indicating that the range of sensitivity control has not been exceeded. A YES at 460 forms loop 465 which comprises steps 439, 440, 450 460 that are circled iteratively until step 440 detects an unlit sensor and tests NO. However, loop 465 may be traversed without detecting an unlit sensor condition until step 460 tests NO indicating that the sensitivity range limit has been met. A NO at step 460, indicates at step 470 that the calibration sequence has failed and causes an on screen display message to be generated at step 475 which indicates that the level of extraneous, incident screen illumination is still too great to permit automated setup.

As described above, loop 465 successively reduces sensitivity until an unlit sensor is detected and step 440 tests NO. The sensitivity value which caused an unlit condition is halved and stored at step 445. Following storage of the 50% sensitivity value, step 480 testes to determine if the current sensor position is number 8. Step 480 initiates a sensor position loop 485 comprising steps 490, 500, loop 465 and step 445. Since step 420 initiated the sequence at sensor position 1 in the green channel, test 480 testes NO which causes step 490 to move block M to sensor position 2. At step 500 the video amplitude value is read from storage (step 270) for this block position and color and applied to the block. The detector sensitivity is restored to the AMBI. SENS. value stored at step 165, and loop 465 is initiated at delay step 430. As described, loop 465 is iterated until step 440 detects an unlit sensor, or step 460 indicates a sensitivity value limit. It is assumed that an unlit sensor condition is achieved and step 440 tests NO causing the corresponding sensitivity value for green sensor position 2 to be halved and stored at step 445. Thus having established the 50% value for sensor position 2 both sensitivity loop 465 and sensor position loop 485 are completed and step 480 tests NO initiating loop 485 for sensor position 3. Thus loops 465 and 485 are circled until step 480 tests YES indicating that the current sensor position is 8, indicating that all sensors for the green channel have been calibrated.

The YES at step 480 causes a color test to occur at step 510 where the current color under calibration is tested, which in this exemplary green sequence results in G. YES. The G. YES at step 510 causes step 520 to switch from green to red marker block generation with the red marker positioned on the red CRT to illuminate sensor position 1. At step 500 the video amplitude of the red marker block is set to the position 1 value, (stored at step 270), and the detector sensitivity is restored to the AMBI. SENS. value stored at step 165. Following initialization of the red block parameters at step 500, iterative adjustment loop 465 is initiated at delay step 430. As described, loop 465 is circled until step 440 detects an unlit sensor, or step 460 indicates a sensitivity value limit. It will be assumed that an unlit sensor condition is achieved and step 440 tests NO causing the corresponding sensitivity value for red sensor position 1 to be halved and stored at step 445. Thus having established the 50% value for sensor position 1 both sensitivity loop 465 and sensor position loop 485 are completed and step 480 tests NO. Loop 485 is reinitiating moving block M to sensor position 2 at step 490, and at step 500, the ambient sensitivity and red position 2 block brightness values are set. Again loops 465 and 485 are iterated until step 480 tests YES indicating that the current sensor position is 8, indicating completion of red channel calibration.

The YES at step 480 initiates step 510 which determines the current color being calibrated and results in R. YES which in turn causes step 530 to switch from red to blue block generation with the blue marker block positioned on the blue CRT to illuminate sensor position 1. At step 500 the blue block parameters are initialized for position 1 and iterative adjustment loop 465 is initiated via delay step 430. As described previously, loops 465 and 485 are circled and successively determine 50% sensitivity values for each sensor position when illuminated by the blue CRT. However, since sensor currents for blue illumination are significantly larger than those of red or green, calibration of blue lit sensors may be more rapidly calibrated with larger control steps increments than those of red or green. Once again step 480 tests YES, indicating completion of eight sensor positions, and color test 510 tests B. YES, which in turn indicates at step 540 that sensor sensitivity calibration has been successfully completed for all sensor positions in each display color. At step 550 convergence pattern edge detection is initiated.

As was described with respect to FIG. 2, the reference current Iref divides or is shared between sensor detector 275 Isw and the exemplary sensor S1, Isens. With light incident on sensor the majority of reference current Iref is conducted by the sensor. However as the control sequence (60, 70, 130, 140,) increments the current, a value is reached where the sensor current requirement is equaled and surplus current is available to cause detector 275 to switch, producing NO at step 70 indicating that the sensor is unlit. The sensor is still lit but the control sequence has now established the peak sensor current and caused the sensor detector to switch. Hence the NO at 70 initiates a test to determine if the threshold or reference current at step 60 is set to minimum, the starting sequence condition. If step 80 tests NO, the current generated by step 60 and caused detector switching, is decrement or halved responsive to step 85.

Having reduced the threshold or reference current, detector 275 switches to indicate a lit sensor at step 70. The YES at 70 causes step 85 to be tested at step 130. Since step 85 decrement current Iref, to establish a detector switching threshold current Ithr, step 130 tests YES and the nominally halved peak current value, Ithr, is stored at step 150. Step 160 tests to determine if the calibration sequence if to be repeated, by YES which loops to step 20, or by NO which ends the calibration sequence. Thus the automated sensor calibration sequence produces digital values corresponding to detector switching threshold currents Ithr which are stored for each sensor position and color. The halving of the peak sensor current value advantageous establishes a switching threshold which is substantially the same for each sensor position and color thus minimizing potential sensor pulse width detection variations during subsequent deflection signal processing.

Figure 8A:
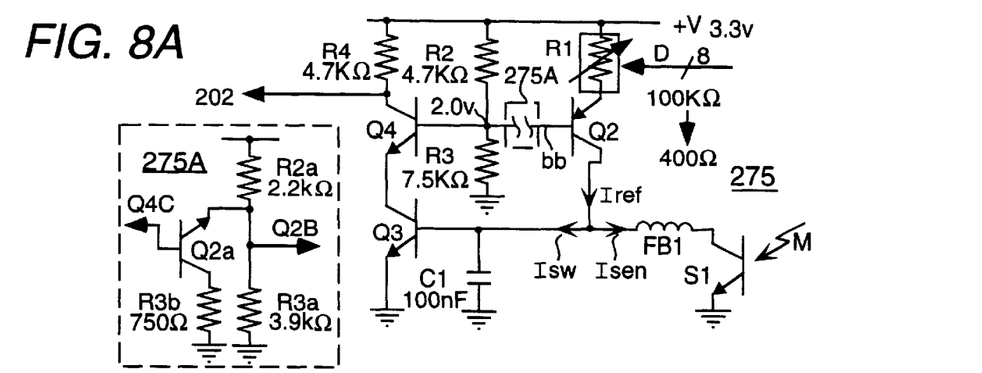
FIGS. 8A and 8B are simplified schematic diagram showing inventive sensor detector arrangements.

A sensor detector is shown in FIG. 8A and comprises a current source transistor Q2 with a digitally controlled emitter network, depicted as resistor R1, coupled between the emitter and the positive supply. The digitally controlled emitter network is shown and described with reference to FIG. 9 which also includes the detector of FIG. 8A. However, in simple terms resistor R1 may be set to binary related values between 200 ohms and 50 K ohms. Thus resistor R1 and the potential at the base of transistor Q2, determine the magnitude of a reference current Iref, generated at the transistor collector. The constant current Iref is divided to form current Isen, which is coupled via a ferrite inductor FB1 to a photo detector S1, for example a photo transistor, and current Isw, which is coupled to the base of an NPN transistor Q3. The base of transistor Q3 is coupled to ground by a capacitor Cl which forms a low pass filter with ferrite inductor FB1 to attenuate high frequency energy resulting from, for example horizontal scanning frequency signals or high voltage arc components that may cause spurious circuit operation or component damage. The emitter of transistor Q3 is grounded and the collector is connected to the emitter of NPN transistor Q4 to form a cascode connected amplifier. The base of transistor Q4 is biased by a voltage divider formed by resistors R2 and R3. Resistor R2 is connected to the positive supply and resistor R3 is connected to ground with the junction of the resistors biasing the bases of transistors Q2 and Q4 to 2 volts when the base emitter junction of transistor Q4 is not conducting. The collector of transistor Q4 generates an output signal 202, which indicates the illuminated state of sensor S1, i.e. lit or unlit, for coupling to a digital convergence integrated circuit, for example type STV2050.

The sensor detector of FIG. 8A operates as follows. The reference current Iref is divided forming a sensor current Isen and a detector or switch current Isw. When sensor S1 is unlit it represents a significant impedance consequently current Isen is insignificantly small comprising, for example, leakage and dark current. Thus with current Isen insignificantly small, the majority of current Iref is directed to the base of transistor Q3 as current Isw. Current Isw causes transistor Q3 to turn on and saturate, forcing the collector to assume a nominally ground potential of Vcesat, approximately 50 millivolts. Hence, the emitter of transistor Q4 is nominally grounded via the saturated collector emitter junction of transistor Q3, and transistor Q4 is turned on causing the collector to assume a potential of nominally 100 millivolts or (Q3 Vcesat+Q4 Vcesat). The collector of transistor Q4 forms output signal 202 where nominally zero volts indicates an unlit sensor condition and the nominal supply voltage represents a lit sensor.

With transistor Q3 saturated, the emitter base potential of transistor Q4 is reduced from nominally 2 volts, due to the resistive divider R2 and R3, to a voltage of about 0.7 volts formed by the base emitter junction voltage of transistor Q4 and the saturation voltage of transistor Q3. Since the base of current source transistors Q2 and cascode transistor Q4 are joined, as depicted by bb of FIG. 8A, the bias at the base of transistor Q2 is also reduced to nominally 0.7 volts. This change in transistor Q2 base potential results in constant current Iref increasing by about three times.

When sensor S1 is lit it generates or sinks current in proportion to the intensity of the incident illumination, thus sensor current Isen increases rapidly. Since the reference current Iref is constant, current for the lit sensor (Isen) is diverted from the base current (Isw) of transistor Q3, causing the transistor to turn off. With transistor Q3 off, transistor Q4 is turned off causing the collector to rise to the supply voltage, generating an output signal 202 of nominally 3.3 volts amplitude indicating a lit sensor. As described previously, with transistors Q3 and Q4 turned off, the base bias of current source transistor Q2 reverts to the potential determined by the resistive divider (R2 and R3) with the result that the magnitude of constant current Iref is decreased by approximately 66%. Thus, the reduction in reference current Iref advantageous sustains or latches the lit sensor condition by establishing a lower switching threshold for terminating detection and indicating a sensor off or unlit condition. In summary the advantageous sensor signal detector permits detection over a range of sensor signal amplitudes represented by predetermined reference current Iref and set by resistor R1 or digital word D. In addition the advantageous feedback coupling provides for a sensor off or unlit detection threshold value which has a substantially constant percentage value for any predetermined reference current Iref value. Hence the detector with hysteresis provides a first detection level set by a current Iref and a second detection level resulting from the changed reference current. Thus detector with feedback prevents intermittent or ragged edge illumination of sensor S1 from toggling the state of output signal 202 and generating multiple spurious measurements within the digital convergence integrated circuit.

An alternate arrangement which provides different detector thresholds is shown in box 275A of FIG. 8A. The circuitry of box 275A is inserted, breaking coupling bb to the base electrode of transistor Q2, as depicted by the wavy lines. The alternate threshold arrangement operates as follows. Resistors R2a and R3a form a potential divider which biases the base of current source transistor Q2 to about 2 volts. A transistor Q2a forms a switch which is activated by the collector potential of transistor Q4. When sensor S1 is unlit transistor Q4 is turned on and the collector is substantially at ground potential which turns on transistor Q2a coupling resistor R3b in parallel with resistor R3a. Thus, the bias at the base of transistor Q2 is changed between nominally 0.7 volts and 2 volts. The lower base voltage provides a lit detection threshold current and the higher voltage reduces the detection threshold current to sustain the detected state with a reduced intensity of illumination.

Figure 8B:
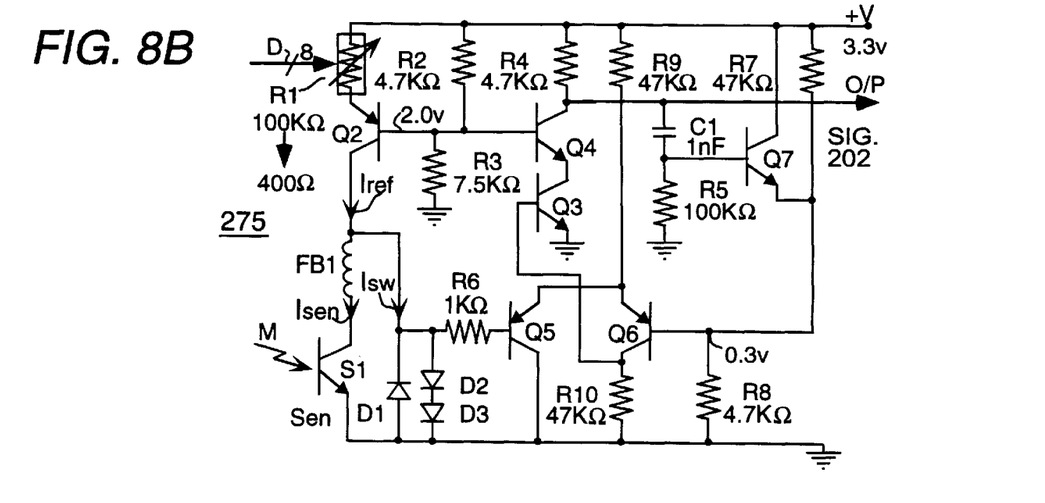

A further sensor detector is shown in FIG. 8B and functions as follows. A PNP transistor Q2 functions as a controllable source of current Iref. The emitter of transistor Q2 is connected to a positive supply +V via a variable resistor R1. The controllable current source depicted by transistor Q2 and variable resistor R1 are shown in greater detail in FIG. 9. The base of transistor Q2 is coupled to a voltage divider formed by resistors R2 and R3, where resistor R2 is connected to the positive supply +V and resistor R3 is connected to ground or the return side of supply +V. The junction of the voltage divider resistors is also connected to the base of an NPN transistor Q4 which is connected in a cascode arrangement with an NPN transistor Q3.

The collector of current source transistor Q2 is connected via an inductor FB1, for example a ferrite choke, to a collector electrode of an opto sensing device S1, for example an opto transistor. The emitter of opto sensor S1 is connected to ground, and the base region is exposed to receive incident photo illumination as depicted by marker M. The collector of transistor Q2 is also connected to a diode network where diode D1 is connected in parallel with a pair of series connected diodes D2 and D3. The cathode of diode D1 is connected to the anode of diode D2 and the anode of diode D1 is connected to the cathode of diode D3. The cathode of diode D3 is connected to ground, and the cathode of diode D1 is connected to the collector of transistor Q2. In addition the collector of transistor Q2 is also connected via a resistor R6 to the base of PNP transistor Q5, which with PNP transistor Q6, forms a differential amplifier. Thus as described with respect to FIG. 3A, current Iref is divided between sensor Si and diode network D1, D2 and D3. When sensor Q1 is unlit, current Iref, becomes current Isw, which is conducted via series connected diodes D2 and D3 to ground. Diode D1 is normally reversed biased and provides a protective path to ground for negative transient effects such as, arcs, EMI etc. Thus, current Isw generates a voltage across diode network D1, D2 and D3 of approximately 1.2 volts which is coupled to the base of transistor Q5. The collector of transistor Q5 is connected to ground and the emitter is connected to the emitter of transistor Q6 which is connected to the positive supply +V via resistor R9. The base of transistor Q6 is connected to the junction of resistors R7 and R8, which form a voltage divider, where resistor R7 is connected to the positive supply +V, and resistor R8 is connected to ground. Thus resistors R7 and R8 bias the base of transistor Q6 to a voltage of approximately 0.3 volts. Since transistors Q5 and Q6 are configured as a differential amplifier, and the base of transistor Q5 is held at 1.2 volts, the approximately 0.3 volt base bias causes transistor Q6 to be turned on and transistor Q5 turned off. Thus current from the positive supply +V, coupled via resistor R9, is divided between collector load resistor R10 and the base of cascode connected transistor Q3. Since the base emitter impedance of transistor Q3 is considerably less than the value of load resistor R10, the majority of the collector current is coupled to ground via the base of transistor Q3, which turns on and saturates. Thus with transistor Q3 saturated, the emmitter of transistor Q4 is brought within ground and responsive to the nominal base bias of 2 volts transistor Q4 turns on and saturates. Hence current flows via resistor R4 and the collector transitor Q4 assumes a potential of 2×Vcesat or approximately 50millivolts. In addition the collector of transistor Q4 forms detector output signal 202 which is coupled to controller 301 of exemplary convergence integrated circuit STV2050.

With transitors Q3 and Q4 saturated, the base of transitor Q4 assumes a potential of [Vbe(Q4)+Vcesat(Q3)] or approximately 0.65 volts. Thus, the current generated by current source transistor Q2 is increased and held at nominal current of (3.3v−0.7v−0.6v)/R1.

When sensor Q1 is illuminated photo generated current or conduction occurs, causing current Isen to increase and current Isw to decrease. At some level of sensor Q1 illumination, sufficient current Isens is diverted from series connected diodes D2 and D3 and conduction ceases, with the result that the base of transistor Q5 assumes the voltage at the collector of sensor Q1. Thus, the base of transistor Q5 brought to a lower potential than that of transistor Q6 causing the transistor pair to switch. Transistor Q5 turns on and conducts current from resistor R9 to ground and transistor Q6 turns off removing base current from cascode transistor Q3, which turns off together with transistor Q4. The collector transistor Q4 then rises to the supply potential +V, and output signal 202 assumes a positive potential indicative of a lit sensor condition. With transistors Q3 and Q4 turned off, the potential at the base of transistor Q2 rises to about 2 volts, as set by resistors R2 and R3. Thus the change in base emitter potential of transistor Q2 causes reference current Iref to reduce to approximately one third, with the consequence that intermittent or ragged edge illumination of sensor Q1 within a range of about three to one is prevented from toggling the state of output signal 202. In addition the action of a differentiator formed by capacitor C1, resistor R5 and transistor Q7 couple a positive transient to the base of transistor Q6 which holds the transistor off and prevents further switching by the transistor pair for a time period determined by the differentiator time constant.

Figure 9:
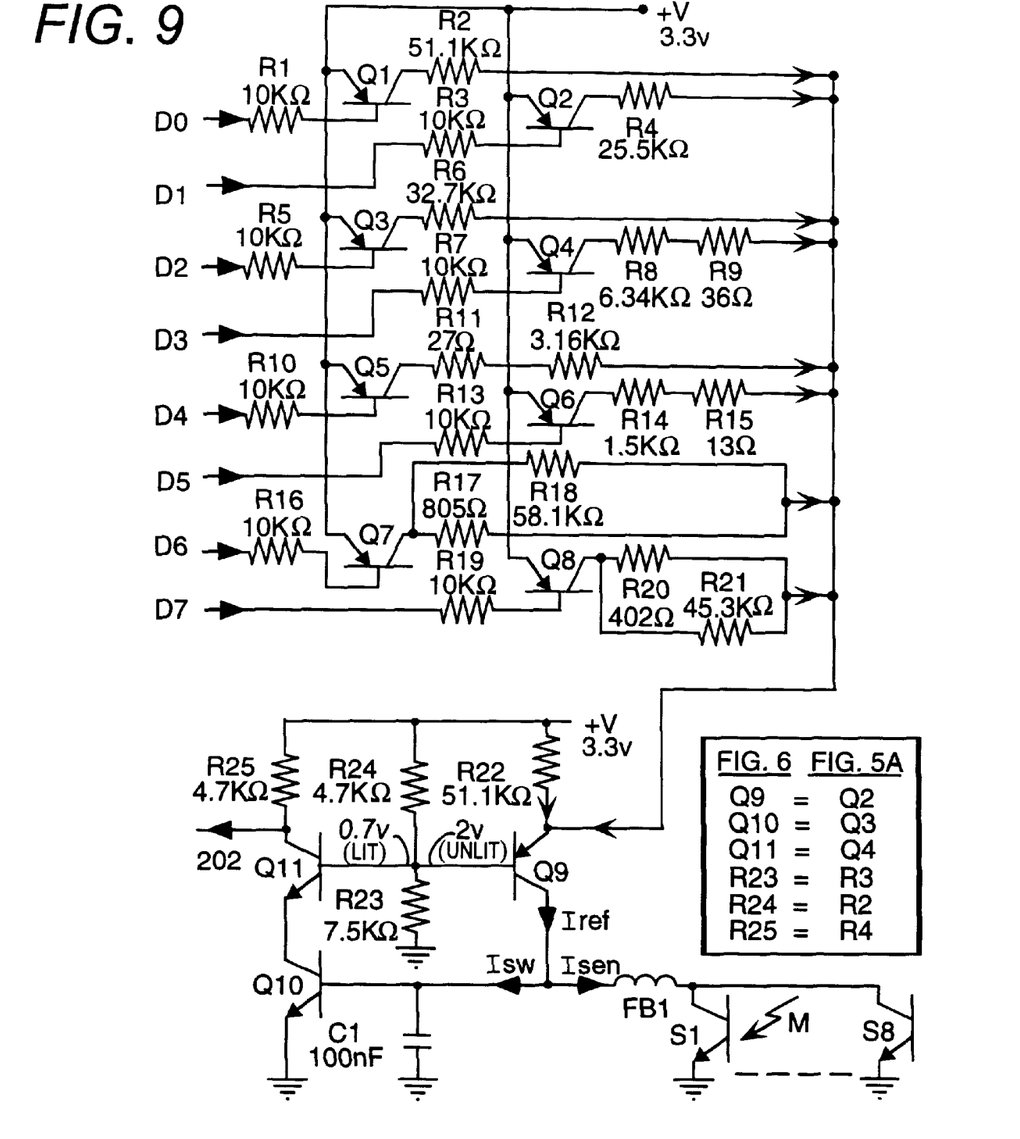
FIG. 9 is a simplified schematic diagram showing an inventive digitally controlled current source.

FIG. 9 shows a digitally controlled current source, for example as depicted by block 250 in FIG. 2, or as variable resistor R1 in FIGS. 8A and 8B. The digitally controlled current source is illustrated in FIG. 9 and shown coupled to the sensor detector described and shown in FIG. 8A. A digital control word D is generated by controller 301 and comprises 8 parallel data signals D0–D7, representing from least to most significance respectively. The individual data bits are coupled via series connected resistors R1, R3, R5, R7, R10, R13, R16 and R19 to the bases of corresponding PNP transistors Q1, Q2, Q3, Q4, Q5, Q6, Q7, and Q8. The emitter of transistor is connected to a positive supply +V and each collector is coupled via a resistor to the emitter of a PNP transistor current source, Q9. Thus the current sourced by transistor Q9 is controlled by emitter resistor R22 and the parallel combination of the digitally selected resistor network. The collector resistors R2, R4, R6, R8 and R9, R11 and R12, R14 and R15, R17 and R18, R20 and R21 are selected to have values of resistance which increase in a binary sequence. For example, the parallel combination of resistors R20 and R21 approximate to 400 ohms, and resistor combination R17 and R18 approximate to 800 ohms. Thus digital word D0–D7 can select resistance values between 200 ohms, with all transistors turned on, and 51.1 kilo ohms, due to resistor R22, with all transistors turned off. Digital word D0–D7 has voltage values of zero and 3.3 volts, with resistor selection occurring when a data bit has a zero volt value, and no resistor selection when the bit has a 3.3 volt value.

As described previously for FIG. 8A, constant current source transistor Q9 generates a collector current Iref which is divided between, or directed to, sensor S1 when lit and switch transistor Q10 when sensor S1 is unlit. However, as previously described the intensity of sensor illumination varies greatly from sensor to sensor and from color to color, hence so too does the sensor current Isen. Thus to establish a consistent switching point for each sensor combination requires that individual reference currents are determined, stored and used for each sensor. Furthermore, as previously described for FIG. 8A, the inventive switching hysteresis resulting from cascode connected transistors Q10 and Q11 advantageous changes the digitally determined reference current to ensure consistent sensing, or detection, of the sensor signal. In simple terms the combined result of the digitally determined reference current and the sensor detection switching hysteresis may be considered to locate the sensor lit threshold at approximately half the peak sensor signal amplitude, with the sensor off, or unlit threshold being set dynamically, by the advantageous hysteresis, to approximately one third the sensor lit threshold value. Thus detector turn on is consistently maintained at about half the sensor amplitude with sensor illumination imperfections largely suppressed and thereby unwanted toggling of sensor detector output signal 202 is prevented.

What is claimed is:
1. A video projection display apparatus, comprising:
    a display device forming an image for projection;
    a display screen receiving said projected image;
    a plurality of photo sensors located adjacent to edges of said display screen and each one of said plurality of photo sensors generating an output signal when illuminated and responsive to an intensity of said projected image;
    a detector receiving a controllable threshold value and said output signal generated by said each one of said plurality, said detector generating a detector output signal having a first state when said output signal generated by said each one of said plurality photo sensors is greater than a threshold value, and a second state when said output signal generated by said each one of said plurality photo sensors is less than said threshold;

a detection threshold generator coupled to said detector and generating said controllable threshold value; and a controller coupled to said detection threshold generator and said display device and generating a digital word for said threshold detector in accordance with said each one of said plurality of photo sensors, and responsive to said detector output signal having a first state said controller generating a controllable threshold value for another one of said plurality of photo sensors.

2. The video projection apparatus of claim 1, wherein said detection threshold generator comprises a digital to analog converter generating said controllable threshold value responsive to said digital word.

3. The video projection apparatus of claim 2, wherein said controllable threshold value has an analog value responsive to said digital word.

4. The video projection apparatus of claim 1, wherein said controllable threshold value has a value specific to a photo sensor location.

5. The video projection apparatus of claim 1, wherein said controllable threshold value has a value specific to a color of said projected image.

6. The video projection apparatus of claim 1, wherein said detector output signal having a first state said controller controls said display device to cause said projected image to move and illuminate another one of said plurality of photo sensors.

* * * * *